(12) United States Patent
Tziovaras et al.

(10) Patent No.: US 12,023,953 B2
(45) Date of Patent: Jul. 2, 2024

(54) LAYER STRUCTURE WITH MODIFIED STRUCTURE, AND PRODUCTION THEREOF

(71) Applicant: Covestro Intellectual Property GmbH & Co. KG, Leverkusen (DE)

(72) Inventors: Georgios Tziovaras, Neuss (DE); Roland Kuenzel, Leverkusen (DE); Christoph Koehler, Duisburg (DE); Kira Planken, Goch (DE); Stefan Janke, Brüggen (DE); Heinz Pudleiner, Krefeld (DE)

(73) Assignee: Covestro Intellectual Property GmbH & Co. KG, Leverkusen (DE)

( * ) Notice: Subject to any disclaimer, the term of this patent is extended or adjusted under 35 U.S.C. 154(b) by 0 days.

(21) Appl. No.: 17/775,341

(22) PCT Filed: Nov. 16, 2020

(86) PCT No.: PCT/EP2020/082217
§ 371 (c)(1),
(2) Date: May 9, 2022

(87) PCT Pub. No.: WO2021/099248
PCT Pub. Date: May 27, 2021

(65) Prior Publication Data
US 2023/0008490 A1   Jan. 12, 2023

(30) Foreign Application Priority Data
Nov. 22, 2019   (EP) ..................................... 19210992

(51) Int. Cl.
*B42D 25/41* (2014.01)
*B23K 26/362* (2014.01)
*B42D 25/351* (2014.01)

(52) U.S. Cl.
CPC ............ *B42D 25/41* (2014.10); *B23K 26/362* (2013.01); *B42D 25/351* (2014.10)

(58) Field of Classification Search
None
See application file for complete search history.

(56) References Cited

U.S. PATENT DOCUMENTS

| 3,692,744 A | 9/1972 | Rene et al. |
| 4,086,212 A | 4/1978 | Bier et al. |

(Continued)

FOREIGN PATENT DOCUMENTS

| DE | 3832396 A1 | 2/1990 |
| EP | 2730425 A1 | 5/2014 |

(Continued)

OTHER PUBLICATIONS

Kunststoff-Handbuch [Plastics Handbook], vol. VIII, p. 695 ff, Karl-Hanser-Verlag, Munich 1973.

(Continued)

*Primary Examiner* — Laura C Powers
(74) *Attorney, Agent, or Firm* — John E. Mrozinski, Jr.

(57) ABSTRACT

The invention relates to a layer structure containing: (A) a first transparent radiation-engravable layer (A) with a first surface a1) and a second surface a2) which runs substantially parallel to the surface a1), said first layer (A) having a colorful or black part-engraving, said engraving being generated by means of nonionizing electromagnetic radiation (E), on the first surface a1) which forms a first outer surface of the layer structure; (B) optionally an additional transparent radiation-engravable layer (B) with a first surface b1) facing towards the first layer (A) and another surface b2) facing away from the first layer (A) and running substantially parallel to the surface b1); and (C) optionally at least one additional transparent plastic layer (C), wherein (Continued)

the additional layer (C) is selectively provided in one of a group of options consisting of: on the face of the first surface a1) of the layer (A), on the face of the additional surface b2) of the additional layer (B), between the two layers (A) and (B), or, in the event of additional layers (C), a combination of at least two of said options, and an image of the colorful or black part-engraving is located on the surface of the layer structure in the form of a nontransparent structural modification forming an additional outer surface of the layer structure and lying opposite the first surface a1). The invention likewise relates to the production of the layer structure as well as to a security document containing the layer structure according to the invention.

5 Claims, 1 Drawing Sheet

(56) References Cited

U.S. PATENT DOCUMENTS

| | | | |
|---|---|---|---|
| 4,107,149 | A | 8/1978 | Bier et al. |
| 4,176,224 | A | 11/1979 | Bier et al. |
| 4,368,240 | A | 1/1983 | Nauta et al. |
| 4,982,014 | A | 1/1991 | Freitag et al. |
| 5,774,168 | A | 6/1998 | Blome |
| 6,733,543 | B2 | 5/2004 | Pyles et al. |
| 6,749,646 | B2 | 6/2004 | Pyles et al. |
| 7,674,845 | B2 | 3/2010 | Van et al. |
| 7,771,646 | B2 | 8/2010 | Clauss et al. |
| 8,980,135 | B2 | 3/2015 | Takeda et al. |
| 2005/0095408 | A1* | 5/2005 | LaBrec ............ B42D 25/41 428/704 |
| 2009/0089942 | A1 | 4/2009 | Pyles et al. |
| 2014/0265301 | A1 | 9/2014 | Haas et al. |
| 2017/0313120 | A1 | 11/2017 | Philippe et al. |
| 2020/0180347 | A1 | 6/2020 | Ederer et al. |
| 2021/0170441 | A1 | 6/2021 | Tziovaras et al. |

FOREIGN PATENT DOCUMENTS

| | | |
|---|---|---|
| EP | 3124282 A1 | 2/2017 |
| GB | 1229482 A | 4/1971 |
| JP | 2008214596 A | 9/2008 |
| WO | 2011020537 A1 | 2/2011 |
| WO | 2014033356 A1 | 3/2014 |
| WO | 2019077317 A1 | 4/2019 |

OTHER PUBLICATIONS

D. Freitag, U. Grigo, P. R. Muller, H. Nouverné, BAYER AG, "Polycarbonates" in Encyclopedia of Polymer Science and Engineering, vol. 11, Second Edition, 1988, pp. 648-718.
J. Grigo, K. Kirchner and P. R. Müller, "Polycarbonate" [Polycarbonates] in Becker/Braun, Kunststoff-Handbuch [Plastics Handbook], vol. 3/1, Polycarbonate, Polyacetale, Polyester, Celluloseester [Polycarbonates, Polyacetals, Polyesters, Cellulose Esters], Carl Hanser Verlag Munich, Vienna 1992, pp. 117-299.
H. Schnell, Chemistry and Physics of Polycarbonates, Interscience Publishers, New York 1964, p. 28 ff; p. 102 ff.
D. G. Legrand, J. T. Bendler, Handbook of Polycarbonate Science and Technology, Marcel Dekker New York 2000, p. 72 ff.
Adachi et al., J. Am. Ceram. Soc. 2008, 91, 2897-2902.
Adachi et al. J.Am. Ceram. Soc. 2007, 90 4059-4061.
International Search Report, PCT/EP2020/082217, date of mailing: Feb. 15, 2021, Authorized officer: Daniela Zacchini.

* cited by examiner

LAYER STRUCTURE WITH MODIFIED STRUCTURE, AND PRODUCTION THEREOF

CROSS REFERENCE TO RELATED APPLICATIONS

This application is a national stage application under 35 U.S.C. § 371 of PCT/EP2020/082217, filed Nov. 16, 2020, which claims benefit of European Application No. 19210992.4, filed Nov. 22, 2019, both of which are incorporated herein by reference in their entireties.

FIELD OF THE INVENTION

The present invention relates to a layer construction with a structural alteration over part of the area and to the production thereof, and to security documents comprising said layer construction. Plastic-based security documents and/or documents of value, especially identification documents, for example ID cards, are nowadays preferably produced without the use of adhesive layers as multilayer composites by means of lamination at high temperatures and high pressure, in order to prevent subsequent separation of the layer constructions for exchange of identification features. The corresponding security features are incorporated into these multilayer composites before or during the lamination process, and these must consequently be configured such that they withstand the lamination process parameters without destruction. Moreover, the security features must not introduce any weak points into the multilayer composite that enable nondestructive subsequent opening of the composite again. Of particular interest are security features that can be introduced after the lamination process or into the finished ID document and, in the case of a forgery, can easily be identified as such. Ideally, it should still be possible to connect the security feature to the document holder's data.

BACKGROUND OF THE INVENTION

Security features in security documents and/or documents of value are typically divided into three safety levels:
- Level 1 security features are those that are perceptible purely visually by the naked eye without use of additional aids.
- Level 2 security features are those that require aids (for example a magnifying glass, an optical filter, a reader etc.) to be visible.
- Level 3 security features are those that can be identified only in a laboratory by forensic methods. In general, the analysis is associated with at least partial destruction of the document.

There is therefore an increased need for level 1 security features that can quickly be perceived, preferably by visual or tactile means, preferably include personal data of the document holder and, in the event of a forgery, can be perceived as such quickly and without aids or with few aids. Such security features are also called personalized security features hereinafter.

In the case of ID documents made of plastic, especially of polycarbonate, the most important personalized security feature is the photo of the document holder. The reason for that is that it can be introduced into the document after the blank document has been completed by means of laser engraving, for example as a black-and-white photo. In order to improve the forgery proofing of laser-engraved photos, methods that enable laser engraving of the photo in color have been developed, as described in European patent application with application number EP 18190363.4. Apart from laser engraving in color, this method enables provision of the photo with partial structuring in order to be able to distinguish it more easily from a forgery. In this way, for example, it is possible to engrave some regions of the photo with more intense laser radiation in order thus to be able to produce additional structuring. With a great deal of effort, however, forgers are also able to create a structure on the photo, for example by partial application of a transparent lacquer.

A popular security feature in ID documents made of polycarbonate is transparent windows. The improvement in proof against forgeries is that the transparency of the window is destroyed in an attempt to commit forgery. The destruction of transparency occurs, for example, when a transparent film is stuck over an ID document, or when the document is split by mechanical means. In some cases, in transparent windows, a laser is used to engrave the photo or other person-specific information of the document holder in order to make an attempted forgery harder. One variant of this is described in WO 2014/151377 A2.

However, there is still a need to further improve the method of color laser engraving to counter forgeries.

BRIEF DESCRIPTION OF THE FIGURES

The present invention will now be described for purposes of illustration and not limitation in conjunction with the figures, wherein.

DETAILED DESCRIPTION OF THE INVENTION

It was therefore an object of the invention to provide a layer construction with forgeryproof engraving in the layer construction, and to provide a more forgeryproof security document manufactured therefrom. A further object was that of providing a process for producing a more forgeryproof layer construction, or a more forgeryproof security document produced by means of the process.

The invention firstly provides a layer construction comprising:
(A) a first transparent radiation-engravable layer (A) having a first surface a1), and a second surface a2) that runs essentially parallel to the surface a1), where the first layer (A) on its first surface a1) which forms a first outer face of the layer construction has a colored or black engraving over part of the area that has been produced by means of nonionizing electromagnetic radiation (E). The nonionizing electromagnetic radiation is preferably laser radiation;
(B) optionally a further transparent radiation-engravable layer (B) having a first surface b1) facing in the direction of the first layer (A) and a further surface b2)

facing in the direction away from the first layer (A) and running essentially parallel to the surface b1);

(C) optionally at least one additional transparent polymer layer (C), where the arrangement of the layer (C) is electively selected from the group consisting of: on the side of the first surface a1) of layer (A), on the side of the further surface b2) of the further layer (B2), between the two layers (A) and (B), or a combination of at least two of these in the case of multiple additional layers (C), wherein an image of the colored or black engraving over part of the area is present in the form of a structural alteration at the surface of the layer construction that forms an outer face of the layer construction and is opposite the first surface a1). The structural alteration is preferably nontransparent.

The structural alteration is also called "nontransparent structural alteration" or simply "altered structure" hereinafter.

The first layer (A) may be manufactured from any transparent radiation-engravable material, the coloring of which is alterable by laser in the presence of a dye. Layer (A) is preferably a polymer layer. What is meant by "coloring alterable by laser" according to the application is that, in the material of the first layer, in the case of an input of a minimum energy of 1 watt in sustained radiation or 5 watts in pulsed radiation by laser, coloring with a dye is achievable, such that this engraving is apparent to the naked eye. For the pulsed radiation, preference is given to using a pulse frequency within a range from 0.5 kHz to 1000 kHz, preferably from 5 kHz to 100 kHz, more preferably from 15 kHz to 50 kHz. For the pulsed radiation, preference is given to choosing a pulse duration of 5 ns to 1000 ns, more preferably from 10 ns to 200 ns.

Layer (A) is preferably a laser-engravable layer. The transparent radiation-engravable layer (A) preferably has a colored engraving over part of the area. The engraving preferably includes structures, such as a written inscription, having a width within a range from 0.005 to 1 mm, further preferably from 0.01 to 0.5 mm, more preferably from 0.02 to 0.1 mm. The engraving preferably has a depth within a range from 0.001 to 2 mm, more preferably from 0.002 to 1 mm, very preferably from 0.005 to 0.5 mm, even more preferably from 0.01 to 0.1 mm.

The first layer (A) and preferably all other optional layers (B) and (C) are transparent and clear. What is understood by "transparent" according to the invention is that it transmits light within a wavelength range from 400 to 700 nm to an extent of more than 80%, preferably to an extent of more than 85%, more preferably to an extent of more than 90%, most preferably to an extent of more than 95%.

The material of the layer construction, especially of the first layer (A), is preferably clear prior to the treatment with a laser. "Clear" in the context of the application means that the layer construction has a haze, also called turbidity, of ≤20%, preferably of ≤15%, more preferably of ≤10%, especially preferably of ≤5%, measured in accordance with standard ASTM D1003:2013.

The optional further layer (B) may be produced from any material that transmits the electromagnetic radiation (E) at least in part, such that the electromagnetic radiation (E) is capable of hitting the surface a1) of layer (A) with sufficient energy to enable coloring. Layer (B) is preferably a polymer layer.

The optional at least one additional layer (C) likewise preferably includes a transparent plastic. The additional layer (C) preferably has the same material composition as the further layer (B) or as the first layer (A).

The layer construction is characterized in that an image of the colored or black engraving over part of the area is present in the form of a structural alteration at the surface of the layer construction that forms an outer face of the layer construction and is opposite the first surface a1). What is understood by "image" is that virtually the same form of the engraving on one side is present in the form of the structural alteration on the opposite side of the layer construction. The image may be shifted slightly with respect to the engraving or be present directly opposite the engraving, i.e. at right angles through the layer construction, on the opposite surface of the layer construction from the engraving.

In a preferred embodiment of the layer construction, the surface of the layer construction which is opposite the first surface a1) and forms a further outer face of the layer construction has the altered structure at least at the sites that are at an angle in the range from 45° to 90° relative to the axis that runs at right angles through the layer construction proceeding from the engraving. It is generally possible to introduce the altered structure at least at the sites in the layer construction that are at an angle within a range from 0° to 90°, further preferably from 5° to 80°, most preferably from 10° to 70°, with respect to the axis that runs at right angles through the layer construction proceeding from the engraving.

This achieves the effect that the colored or black engraving is optically covered at least partly, preferably completely, by the nontransparent structural alteration, at a viewing angle of 45° to 90° from the side of the layer construction having the nontransparent structural alteration. The optical coverage of the colored or black engraving by the nontransparent structural alteration, at least at a viewing angle within a range from 45° to 90° from the side of the layer construction having the nontransparent structural alteration, is preferably within a range from 50% to 100%, more preferably from 60% to 90%, especially preferably from 70% to 80%, based on the width of the colored or black engraving.

The structural alteration on the outer face of the layer construction is characterized in that the layer no longer shows any, or shows little, transparency at the sites with structural alteration, but may still be translucent, which is visually manifested in a milky appearance. One explanation for the structural alteration may be that, on account of the very rapid melting of the layer at the site of entry of the electromagnetic radiation (E), air bubbles are trapped in the material of the layer. Another explanation could be a chemical structural alteration of the material at the site of entry of the electromagnetic radiation (E) into the layer.

In a preferred embodiment of the layer construction, the altered structure has a cloudy or milky appearance. The regions of the layer construction that include the altered structure preferably have a turbidity or haze of ≥20%, preferably of ≥50%, more preferably of ≥80%, measured with a BYK-Gardner haze gard plus instrument in accordance with standard ASTM D1003:2013.

Further preferably, the altered structure appears as a white engraving on the layer construction. As already mentioned, the altered structure is present on a surface of the layer construction opposite the surface on which the colored or black engraving over part of the area is present. The colored or black engraving over part of the area thus points in the opposite direction of the layer construction from the altered structure. Since the altered structure is milky and hazy, preferably at least a portion, preferably the entirety, of the colored or black engraving is covered by the altered structure. It is thus possible that the colored or black engraving is no longer visible from the side where the altered structure is present. The visibility of the colored or black engraving from the side of the altered structure can be adjusted via the choice of width of the altered structure. Conversely, the altered structure can be covered via the choice of width of the colored or black engraving if the layer construction is viewed from the side of the colored or black engraving.

In a preferred embodiment of the layer construction, layer (B) at the sites with the altered structure has a layer thickness at least 0.001 mm thicker than at the points without altered structure.

In a preferred embodiment of the layer construction, at least one of, preferably all of, layers (A), (B) and (C) has/have one of, preferably all of, the following properties:
I. a layer thickness within a range from 10 µm to 10 000 µm; preferably within a range from 20 µm to 7000 µm, more preferably within a range from 30 µm to 5000 µm, most preferably within a range from 70 µm to 2000 µm, determined by means of a micrometer screw or by means of microtomal section and subsequent microscope sight thickness measurement;
II. a radiation transmittance of ≥2% to ≤99.95%, preferably of ≥4% to ≤90%, more preferably of ≥5% to ≤85%, for the chosen radiation, preferably determined by the UV-VIS-NIR-MIR method to DIN EN ISO/IEC 17025.

In a preferred embodiment of the layer construction, at least layer (A), and preferably also layer (B), include(s) a thermoplastic selected from the group consisting of polymers of ethylenically unsaturated monomers, polycondensates of bifunctional reactive compounds and polyaddition products of bifunctional reactive compounds or combinations of at least two of these.

Preferred thermoplastics are one or more polycarbonate(s) or copolycarbonate(s) based on diphenols, poly- or copolyacrylate(s) and poly- or copolymethacrylate(s) such as, by way of example and with preference, polymethylmethacrylate or poly(meth)acrylate (PMMA), polymer(s) or copolymer(s) with styrene such as, by way of example and with preference, polystyrene (PS), acrylonitrile-butadiene-styrene (ABS), or polystyrene-acrylonitrile (SAN), thermoplastic polyurethane(s) and also polyolefin(s) such as, by way of example and with preference, polypropylene types or polyolefins based on cyclic olefins (e.g. TOPAS®, Hoechst), poly- or copolycondensate(s) of terephthalic acid such as, by way of example and with preference, poly- or copolyethylene terephthalate (PET or CoPET), glycol-modified PET (PETG), glycol-modified poly- or copolycyclohexanedimethylene terephthalate (PCTG) or poly- or copolybutylene terephthalate (PBT or CoPBT), polyamide (PA), poly- or copolycondensate(s) of naphthalenedicarboxylic acid such as, by way of example and with preference, polyethylene glycol naphthalate (PEN), poly- or copolycondensate(s) of at least one cycloalkyldicarboxylic acid such as, by way of example and with preference, polycyclohexanedimethanolcyclohexanedicarboxylic acid (PCCD), polysulfones (PSU), mixtures of at least two of the above or blends thereof.

Particularly preferred thermoplastics are one or more polycarbonate(s) or copolycarbonate(s) based on diphenols or blends containing at least one polycarbonate or copolycarbonate. Very particular preference is given to blends containing at least one polycarbonate or copolycarbonate and at least one poly- or copolycondensate of terephthalic acid, of naphthalenedicarboxylic acid or of a cycloalkyldicarboxylic acid, preferably of cyclohexanedicarboxylic acid. Very particular preference is given to polycarbonates or copolycarbonates, especially having average molecular weights Mw of 500 to 100 000, preferably of 10 000 to 80 000, more preferably of 15 000 to 40 000, or blends thereof with at least one poly- or copolycondensate of terephthalic acid having average molecular weights Mw of 10 000 to 200 000, preferably of 21 000 to 120 000.

Suitable poly- or copolycondensates of terephthalic acid in preferred embodiments of the invention are polyalkylene terephthalates. Suitable polyalkylene terephthalates are, for example, reaction products of aromatic dicarboxylic acids or their reactive derivatives (for example dimethyl esters or anhydrides) and aliphatic, cycloaliphatic or araliphatic diols and mixtures of these reaction products.

Preferred polyalkylene terephthalates can be prepared from terephthalic acid (or reactive derivatives thereof) and aliphatic or cycloaliphatic diols having 2 to 10 C atoms by known methods (Kunststoff-Handbuch [Plastics Handbook], vol. VIII, p. 695 ff, Karl-Hanser-Verlag, Munich 1973).

Preferred polyalkylene terephthalates contain at least 80 mol %, preferably 90 mol %, of terephthalic acid radicals, based on the dicarboxylic acid component, and at least 80 mol %, preferably at least 90 mol %, of ethylene glycol and/or butane-1,4-diol and/or cyclohexane-1,4-dimethanol radicals, based on the diol component.

The preferred polyalkylene terephthalates may contain, in addition to terephthalic acid radicals, up to 20 mol % of radicals of other aromatic dicarboxylic acids having 8 to 14 carbon atoms or of aliphatic dicarboxylic acids having 4 to 12 carbon atoms, such as for example radicals of phthalic acid, isophthalic acid, naphthalene-2,6-dicarboxylic acid, 4,4'-diphenyldicarboxylic acid, succinic acid, adipic acid, sebacic acid, azelaic acid, cyclohexanediacetic acid.

The preferred polyalkylene terephthalates may contain, in addition to ethylene and/or butane-1,4-diol glycol radicals, up to 80 mol % of other aliphatic diols having 3 to 12 carbon atoms or of cycloaliphatic diols having 6 to 21 carbon atoms, for example radicals of propane-1,3-diol, 2-ethylpropane-1,3-diol, neopentyl glycol, pentane-1,5-diol, hexane-1,6-diol, cyclohexane-1,4-dimethanol, 3-methylpentane-2,4-diol, 2-methylpentane-2,4-diol, 2,2,4-trimethylpentane-1,3-diol and 2-ethylhexane-1,6-diol, 2,2-diethylpropane-1,3-diol, hexane-2,5-diol, 1,4-di([beta]-hydroxyethoxy)benzene, 2,2-bis(4-hydroxycyclohexyl)propane, 2,4-dihydroxy-1,1,3,3-tetramethylcyclobutane, 2,2-bis(3-[beta]-hydroxyethoxyphenyl)propane and 2,2-bis(4-hydroxypropoxyphenyl)propane (cf. DE-A 24 07 674, 24 07 776, 27 15 932).

The polyalkylene terephthalates may be branched by incorporation of relatively small amounts of tri- or tetrahydric alcohols or tri- or tetrabasic carboxylic acids, as described for example in DE-A 19 00 270 and U.S. Pat. No. 3,692,744. Examples of preferred branching agents are trimesic acid, trimellitic acid, trimethylolethane and trimethylolpropane and pentaerythritol.

It is preferable when not more than 1 mol % of the branching agent is used, based on the acid component.

Particular preference is given to polyalkylene terephthalates which have been prepared solely from terephthalic acid and the reactive derivatives thereof (e.g. the dialkyl esters thereof) and ethylene glycol and/or butane-1,4-diol and/or cyclohexane-1,4-dimethanol radicals, and to mixtures of these polyalkylene terephthalates.

Preferred polyalkylene terephthalates further include copolyesters produced from at least two of the abovementioned acid components and/or from at least two of the abovementioned alcohol components; particularly preferred copolyesters are poly(ethylene glycol/butane-1,4-diol) terephthalate s.

The polyalkylene terephthalates preferably used as component preferably have an intrinsic viscosity of about 0.4 to 1.5 dl/g, preferably 0.5 to 1.3 dl/g, measured in each case in phenol/o-dichlorobenzene (1:1 parts by weight) at 25° C.

The blend of at least one polycarbonate or copolycarbonate with at least one poly- or copolycondensate of terephthalic acid is preferably a blend of at least one polycarbonate or copolycarbonate with poly- or copolybutylene terephthalate or glycol-modified poly- or copolycyclohexanedimethylene terephthalate. Such a blend of polycarbonate or copolycarbonate with poly- or copolybutylene terephthalate or glycol-modified poly- or copolycyclohexanedimethylene terephthalate may preferably be one comprising 1% to 90% by weight of polycarbonate or copolycarbonate and 99% to 10% by weight of poly- or copolybutylene terephthalate or glycol-modified poly- or copolycyclohexanedimethylene terephthalate, preferably comprising 1% to 90% by weight of polycarbonate and 99% to 10% by weight of polybutylene terephthalate or glycol-modified polycyclohexanedimethylene terephthalate, wherein the proportions add up to 100% by weight. Such a blend of polycarbonate or copolycarbonate with poly- or copolybutylene terephthalate or glycol-modified poly- or copolycyclohexanedimethylene terephthalate may more preferably be one comprising 20% to 85% by weight of polycarbonate or copolycarbonate and 80% to 15% by weight of poly- or copolybutylene terephthalate or glycol-modified poly- or copolycyclohexanedimethylene terephthalate, preferably comprising 20% to 85% by weight of polycarbonate and 80% to 15% by weight of polybutylene terephthalate or glycol-modified polycyclohexanedimethylene terephthalate, wherein the proportions add up to 100% by weight. Such a blend of polycarbonate or copolycarbonate with poly- or copolybutylene terephthalate or glycol-modified poly- or copolycyclohexanedimethylene terephthalate may most preferably be one comprising 35% to 80% by weight of polycarbonate or copolycarbonate and 65% to 20% by weight of poly- or copolybutylene terephthalate or glycol-modified poly- or copolycyclohexanedimethylene terephthalate, preferably comprising 35% to 80% by weight of polycarbonate and 65% to 20% by weight of polybutylene terephthalate or glycol-modified polycyclohexanedimethylene terephthalate, wherein the proportions add up to 100% by weight. Very particularly preferred embodiments may involve blends of polycarbonate and glycol-modified poly-cyclohexanedimethylene terephthalate in the aforementioned compositions.

Suitable polycarbonates or copolycarbonates in preferred embodiments are particularly aromatic polycarbonates or copolycarbonates.

The polycarbonates or copolycarbonates may be linear or branched in known fashion.

These polycarbonates can be prepared in a known manner from diphenols, carbonic acid derivatives, optionally chain terminators and optionally branching agents. Details of the production of polycarbonates have been set out in many patent specifications during the last 40 years or so. Reference may be made here merely by way of example to Schnell, "Chemistry and Physics of Polycarbonates", Polymer Reviews, Volume 9, Interscience Publishers, New York, London, Sydney 1964, to D. Freitag, U. Grigo, P. R. Müller, H. Nouvertné, BAYER AG, "Polycarbonates" in Encyclopedia of Polymer Science and Engineering, Volume 11, Second Edition, 1988, pages 648-718 and finally to Dres. U. Grigo, K. Kirchner and P. R. Müller, "Polycarbonate" [Polycarbonates] in Becker/Braun, Kunststoff-Handbuch [Plastics Handbook], volume 3/1, Polycarbonate, Polyacetale, Polyester, Celluloseester [Polycarbonates, Polyacetals, Polyesters, Cellulose Esters], Carl Hanser Verlag Munich, Vienna 1992, pages 117-299.

Suitable diphenols may be, for example, dihydroxyaryl compounds of general formula (I)

$$HO-Z-OH \qquad (I)$$

in which Z is an aromatic radical which has 6 to 34 carbon atoms and may contain one or more optionally substituted aromatic rings and aliphatic or cycloaliphatic radicals or alkylaryls or heteroatoms as bridging elements.

Examples of suitable dihydroxyaryl compounds include: dihydroxybenzenes, dihydroxydiphenyls, bis(hydroxyphenyl)alkanes, bis(hydroxyphenyl)cycloalkanes, bis(hydroxyphenyl)aryls, bis(hydroxyphenyl) ethers, bis(hydroxyphenyl) ketones, bis(hydroxyphenyl) sulfides, bis(hydroxyphenyl) sulfones, bis(hydroxyphenyl) sulfoxides, 1,1'-bis(hydroxyphenyfldiisopropylbenzenes and the ring-alkylated and ring-halogenated compounds thereof.

These and further suitable other dihydroxyaryl compounds are described, for example, in DE-A 3 832 396, FR-A 1 561 518, in H. Schnell, Chemistry and Physics of Polycarbonates, Interscience Publishers, New York 1964, p. 28 ff; p. 102 ff, and in D. G. Legrand, J. T. Bendler, Handbook of Polycarbonate Science and Technology, Marcel Dekker New York 2000, p. 72 ff.

Preferred dihydroxyaryl compounds are, for example, resorcinol, 4,4'-dihydroxydiphenyl, bis(4-hydroxyphenyl)methane, bis(3,5-dimethyl-4-hydroxyphenyl)methane, bis(4-hydroxyphenyl)diphenylmethane, 1,1-bis(4-hydroxyphenyl)-1-phenylethane, 1,1-bis(4-hydroxyphenyl)-1-(1-naphthyl)ethane, 1,1-bis(4-hydroxyphenyl)-1-(2-naphthyl)ethane, 2,2-bis(4-hydroxyphenyl)propane, 2,2-bis(3-methyl-4-hydroxyphenyl)propane, 2,2-bis(3,5-dimethyl-4-hydroxyphenyl)propane, 2,2-bis(4-hydroxyphenyl)-1-phenylpropane, 2,2-bis(4-hydroxyphenyl)hexafluoropropane, 2,4-bis(4-hydroxyphenyl)-2-methylbutane, 2,4-bis(3,5-dimethyl-4-hydroxyphenyl)-2-methylbutane, 1,1-bis(4-hydroxyphenyl)cyclohexane, 1,1-bis(3,5-dimethyl-4-hydroxyphenyl)cyclohexane, 1,1-bis(4-hydroxyphenyl)-4-methylcyclohexane, 1,3-bis[2-(4-hydroxyphenyl)-2-propyl]benzene, 1,1'-bis(4-hydroxyphenyl)-3-diisopropylbenzene, 1,1'-bis(4-hydroxyphenyl)-4-diisopropylbenzene, 1,3-bis[2-(3,5-dimethyl-4-hydroxyphenyl)-2-propyl]benzene, bis(4-hydroxyphenyl) ether, bis(4-hydroxyphenyl) sulfide, bis(4-hydroxyphenyl) sulfone, bis(3,5-dimethyl-4-hydroxyphenyl) sulfone and 2,2',3,3'-tetrahydro-3,3,3',3'-tetramethyl-1,1'-spirobi[1H-indene]-5,5'-diol or dihydroxydiphenylcycloalkanes of the formula (Ia) in which (Ia)

$R^1$ and $R^2$ are independently hydrogen, halogen, preferably chlorine or bromine, $C_1$-$C_8$-alkyl, $C_5$-$C_6$-cycloalkyl, $C_6$-$C_{10}$-aryl, preferably phenyl, and $C_7$-$C_{12}$-aralkyl, preferably phenyl-$C_1$-$C_4$-alkyl, especially benzyl, m is an integer from 4 to 7, preferably 4 or 5,

$R^3$ and $R^4$ can be chosen individually for each X and are independently hydrogen or $C_1$-$C_6$-alkyl and X is carbon, with the proviso that, on at least one atom X, $R^3$ and $R^4$ are both alkyl. Preferably, in the formula (Ia), on one or two X atom(s), especially only on one X atom, $R^3$ and $R^4$ are both alkyl.

A preferred alkyl radical for the $R^3$ and $R^4$ radicals in formula (Ia) is methyl. The X atoms in alpha position to the diphenyl-substituted carbon atom (C-1) are preferably not dialkyl-substituted; by contrast, preference is given to alkyl disubstitution in beta position to C-1.

Particularly preferred dihydroxydiphenylcycloalkanes of formula (Ia) are those having 5 and 6 ring carbon atoms X in the cycloaliphatic radical (m=4 or 5 in formula (Ia)), for example the diphenols of formulae (Ia-1) to (Ia-3), A very particularly preferred dihydroxydiphenylcycloalkane of formula (Ia) is 1,1-bis(4-hydroxyphenyl)-3,3,5-trimethylcyclohexane (formula (Ia-1) where $R^1$ and $R^2$=H).

Such polycarbonates may be prepared from dihydroxydiphenylcycloalkanes of formula (Ia) according to EP-A 359 953.

Particularly preferred dihydroxyaryl compounds are resorcinol, 4,4'-dihydroxydiphenyl, bis(4-hydroxyphenyl) diphenylmethane, 1,1-bis(4-hydroxyphenyl)-1-phenylethane, bis(4-hydroxyphenyl)-1-(1-naphthyl)ethane, bis(4-hydroxyphenyl)-1-(2-naphthyl)ethane, 2,2-bis(4-hydroxyphenyl)propane, 2,2-bis(3,5-dimethyl-4-hydroxyphenyl)propane, 1,1-bis(4-hydroxyphenyl) cyclohexane, 1,1-bis(3,5-dimethyl-4-hydroxyphenyl) cyclohexane, 1,1-bis(4-hydroxyphenyl)-3,3,5-trimethylcyclohexane, 1,1'-bis(4-hydroxyphenyl)-3-diisopropylbenzene and 1,1'-bis(4-hydroxyphenyl)-4-diisopropylbenzene.

Very particularly preferred dihydroxyaryl compounds are 4,4'-dihydroxydiphenyl and 2,2-bis(4-hydroxyphenyl)propane.

It is possible to use either one dihydroxyaryl compound to form homopolycarbonates or different dihydroxyaryl compounds to form copolycarbonates. It is possible to use either one dihydroxyaryl compound of formula (I) or (Ia) to form homopolycarbonates or two or more dihydroxyaryl compounds of formula (e) (I) and/or (Ia) to form copolycarbonates. The various dihydroxyaryl compounds may be interconnected in random or blockwise fashion. In the case of copolycarbonates composed of dihydroxyaryl compounds of formulae (I) and (Ia), the molar ratio of dihydroxyaryl compounds of formula (Ia) to the other dihydroxyaryl compounds of formula (I) that are optionally usable as well is preferably between 99 mol % of (Ia) to 1 mol % of (I) and 2 mol % of (Ia) to 98 mol % of (I), preferably between 99 mol % of (Ia) to 1 mol % of (I) and 10 mol % of (Ia) to 90 mol % of (I), and especially between 99 mol % of (Ia) to 1 mol % of (I) and 30 mol % of (Ia) to 70 mol % of (I).

A very particularly preferred copolycarbonate can be prepared using 1,1-bis(4-hydroxyphenyl)-3,3,5-trimethylcyclohexane and 2,2-bis(4-hydroxyphenyl)propane dihydroxyaryl compounds of formulae (Ia) and (I).

Suitable carbonic acid derivatives may be, for example, diaryl carbonates of general formula (II)

in which

R, R' and R'' are the same or different and are independently hydrogen, linear or branched $C_1$-$C_{34}$-alkyl, $C_7$-$C_{34}$-alkylaryl or $C_6$-$C_{34}$-aryl, R may additionally also be —COO—R''' where R''' is hydrogen, linear or branched $C_1$-$C_{34}$-alkyl, $C_7$-$C_{34}$-alkylaryl or $C_6$-$C_{34}$-aryl.

Preferred diaryl carbonates are, for example, diphenyl carbonate, methylphenyl phenyl carbonates and di(methylphenyl) carbonates, 4-ethylphenyl phenyl carbonate, di(4-ethylphenyl) carbonate, 4-n-propylphenyl phenyl carbonate, di(4-n-propylphenyl) carbonate, 4-isopropylphenyl phenyl carbonate, di(4-isopropylphenyl) carbonate, 4-n-butylphenyl phenyl carbonate, di(4-n-butylphenyl) carbonate, 4-isobutylphenyl phenyl carbonate, di(4-isobutylphenyl) carbonate, 4-tert-butylphenyl phenyl carbonate, di(4-tert-butylphenyl) carbonate, 4-n-pentylphenyl phenyl carbonate, di(4-n-pentylphenyl) carbonate, 4-n-hexylphenyl phenyl carbonate, di(4-n-hexylphenyl) carbonate, 4-isooctylphenyl phenyl carbonate, di(4-isooctylphenyl) carbonate, 4-n-nonylphenyl phenyl carbonate, di(4-n-nonylphenyl) carbonate, 4-cyclohexylphenyl phenyl carbonate, di(4-cyclohexylphenyl) carbonate, 4-(1-methyl-1-phenylethyl)phenyl phenyl carbonate, di[4-(1-methyl-1-phenylethyl)phenyl]carbonate, biphenyl-4-yl phenyl carbonate, di(biphenyl-4-yl) carbonate, 4-(1-naphthyl)phenyl phenyl carbonate, 4-(2-naphthyl) phenyl phenyl carbonate, di[4-(1-naphthyl)phenyl]carbonate, di[4-(2-naphthyl)phenyl]carbonate, 4-phenoxyphenyl phenyl carbonate, di(4-phenoxyphenyl) carbonate, 3-pentadecylphenyl phenyl carbonate, di(3-pentadecylphenyl) carbonate, 4-tritylphenyl phenyl carbonate, di(4-tritylphenyl) carbonate, (methyl salicylate) phenyl carbonate, di(methyl salicylate) carbonate, (ethyl salicylate) phenyl carbonate, di(ethyl salicylate) carbonate, (n-propyl salicylate) phenyl carbonate, di(n-propyl salicylate) carbonate, (isopropyl salicylate) phenyl carbonate, di(isopropyl salicylate) carbonate, (n-butyl salicylate) phenyl carbonate, di(n-butyl salicylate) carbonate, (isobutyl salicylate) phenyl carbonate, di(isobutyl salicylate) carbonate, (tert-butyl salicylate) phenyl carbonate, di(tert-butyl salicylate) carbonate, diphenyl salicylate) carbonate and di(benzyl salicylate) carbonate.

Particularly preferred diaryl compounds are diphenyl carbonate, 4-tert-butylphenyl phenyl carbonate, di(4-tert-butylphenyl) carbonate, biphenyl-4-yl phenyl carbonate, di(biphenyl-4-yl) carbonate, 4-(1-methyl-1-phenylethyl) phenyl phenyl carbonate, di[4-(1-methyl-1-phenylethyl) phenyl]carbonate and di(methyl salicylate) carbonate. Diphenyl carbonate is very particularly preferred.

It is possible to use either one diaryl carbonate or different diaryl carbonates.

For control or variation of the end groups, it is additionally possible to use, for example, one or more monohydroxyaryl compound(s) as chain terminators that were not used for preparation of the diaryl carbonate(s) used. These may be those of the general formula (III)

(III)

where $R^A$ is linear or branched $C_1$-$C_{34}$-alkyl, $C_7$-$C_{34}$-alkylaryl, $C_6$-$C_{34}$-aryl or —COO—$R^D$ where $R^D$ is hydrogen, linear or branched $C_1$-$C_{34}$-alkyl, $C_7$-$C_{34}$-alkylaryl or $C_6$-$C_{34}$-aryl, and $R^B$, $R^C$ are the same or different and are independently hydrogen, linear or branched $C_1$-$C_{34}$-alkyl, $C_7$-$C_{34}$-alkylaryl or $C_6$-$C_{34}$-aryl.

Such monohydroxyaryl compounds are, for example, 1-, 2- or 3-methylphenol, 2,4-dimethylphenol, 4-ethylphenol, 4-n-propylphenol, 4-isopropylphenol, 4-n-butylphenol, 4-isobutylphenol, 4-tert-butylphenol, 4-n-pentylphenol, 4-n-hexylphenol, 4-isooctylphenol, 4-n-nonylphenol, 3-pentadecylphenol, 4-cyclohexylphenol, 4(1-methyl-1-phenylethyl)phenol, 4-phenylphenol, 4-phenoxyphenol, 4-(1-naphthyl)phenol, 4-(2-naphthyl)phenol, 4-tritylphenol, methyl salicylate, ethyl salicylate, n-propyl salicylate, isopropyl salicylate, n-butyl salicylate, isobutyl salicylate, tert-butyl salicylate, phenyl salicylate and benzyl salicylate.

Preference is given to 4-tert-butylphenol, 4-isooctylphenol and 3-pentadecylphenol.

Suitable branching agents may include compounds having three or more functional groups, preferably those having three or more hydroxyl groups.

Suitable compounds having three or more phenolic hydroxyl groups are, for example, phloroglucinol, 4,6-dimethyl-2,4,6-tri(4-hydroxyphenyl)hept-2-ene, 4,6-dimethyl-2,4,6-tri(4-hydroxyphenyl)heptane, 1,3,5-tri(4-hydroxyphenyl)benzene, 1,1,1-tri(4-hydroxyphenyl)ethane, tri(4-hydroxyphenyl)phenylmethane, 2,2-bis(4,4-bis(4-hydroxyphenyl)cyclohexyl]propane, 2,4-bis(4-hydroxyphenylisopropyl)phenol and tetra(4-hydroxyphenyl)methane.

Other suitable compounds having three and more functional groups are, for example, 2,4-dihydroxybenzoic acid, trimesic acid/trimesoyl trichloride, cyanuric trichloride and 3,3-bis(3-methyl-4-hydroxyphenyl)-2-oxo-2,3-dihydroindole.

Preferred branching agents are 3,3-bis(3-methyl-4-hydroxyphenyl)-2-oxo-2,3-dihydroindole and 1, 1,1-tri(4-hydroxyphenyl)ethane.

In a preferred embodiment of the layer construction, layer (A), and preferably also layer (B), comprise(s) at least one additive having an absorption maximum in the wavelength range of the focused nonionizing electromagnetic radiation used, or wherein layer (A), and preferably also layer (B), is/are coated with at least one additive in the form of a coating composition having an absorption maximum in the wavelength range of the focused nonionizing electromagnetic radiation used.

Suitable additives include in principle all laser-sensitive additives, so-called laser marking additives, i.e. additives composed of an absorber in the wavelength range of the radiation (C) to be used. The additive preferably comprises at least one or more organic and/or inorganic IR absorbers, preferably inorganic IR absorbers. Such additives and the use thereof in molding compounds are described for example in WO-A 2004/50766 and WO-A 2004/50767 and are commercially available from DSM under the brand name Micabs™.

Suitable organic IR absorbers are for example compounds having the highest possible absorption between 700 and 2500 nm (near-infrared=NIR). Suitable infrared absorbers include for example those known from the literature as described by substance class for example in M. Matsuoka, Infrared Absorbing Dyes, Plenum Press, New York, 1990. Particularly suitable are infrared absorbers from the substance classes comprising the azo, azomethine, methine, anthraquinone, indanthrone, pyranthrone, flavanthrone, benzanthrone, phthalocyanine, perylene, dioxazine, thioindigo, isoindoline, isoindolinone, quinacridone, pyrrolopyrrole or quinophthalone pigments as well as metal complexes of azo, azomethine or methine dyes or metal salts of azo compounds. Among these, phthalocyanines and naphthalocyanines are very particularly suitable. On account of their improved solubility in thermoplastic plastics phthalocyanines and naphthalocyanines having bulky side groups are preferable.

Suitable inorganic IR absorbers are, for example, mixed oxides of metals such as for example phosphorus-containing tin-copper mixed oxides, as described in WO-A 2006/042714 for example, those from the group of borides and/or tungstates and mixtures thereof, preferably at least one or more IR absorbers from the group of borides and/or tungstates and mixtures thereof, more preferably at least one or more IR absorbers from the group of tungstates.

Suitable inorganic IR absorbers from the group of borides include for example compounds of the type $M_xB_y$, (M=La, Ce, Pr, Nd, Tb, Dy, Ho, Y, Sm, Eu, Er, Tm, Yb, Lu, Sr, Ti, Zr, Hf, V, Ta, Cr, Mo, W and Ca; and x and y are integers from 1 to 6) such as lanthanum hexaboride ($LaB_6$), praseodymium boride ($PrB_6$), neodymium boride ($NdB_6$), cerium boride ($CeB_6$), terbium boride ($TbB_6$), dysprosium boride ($DyB_6$), holmium boride ($HoB_6$), yttrium boride ($YB_6$), samarium boride ($SmB_6$), europium boride ($EuB_6$), erbium boride ($ErB_6$), thulium boride (TmB6), ytterbium boride ($YbB_6$), lutetium boride ($LuB_6$), strontium boride ($SrB_6$), calcium boride ($CaB_6$), titanium boride ($TiB_2$), zirconium boride ($ZrB_2$), hafnium boride ($HfB_2$), vanadium boride ($VB_2$), tantalum boride ($TaB_2$), chromium boride (CrB and $CrB_2$), molybdenum boride ($MoB_2$, $Mo_2B_5$ and MoB), tungsten boride ($W_2B_5$) or combinations thereof.

Suitable inorganic IR absorbers from the group of tungstates also include for example those from the group of tungsten compounds of the type $W_yO_z$ (W=tungsten, O=oxygen; $z/y$=2.20–2.99) and/or $M_xW_yO_z$ (M=H, He, alkali metal, alkaline earth metal, metal from the group of the rare earths, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi; $x/y$=0.001-1.000; $z/y$=2.2-3.0), wherein elements preferred as M are H, Cs, Rb, K, Tl, In, Ba, Li, Ca, Sr, Fe and Sn, among which very particular preference is given to Cs. Particular preference is given to $Ba_{0.33}WO_3$, $Tl_{0.33}WO_3$, $K_{0.33}WO_3$, $Rb_{0.33}WO_3$, $Cs_{0.33}WO_3$, $Na_{0.33}WO_3$, $Na_{0.75}WO_3$ and mixtures thereof. In a particular embodiment of the present invention, the sole use of $Cs_{0.33}WO_3$ as inorganic IR absorber is very particularly preferred. Likewise preferred are Cs/W ratios of 0.20 and 0.25.

Among the inorganic IR absorbers, the tungstates are preferable over the borides on account of their low inherent coloration if the process of the invention is to be effected on layer constructions having a radiation transmittance of ≥10% to ≤99%, preferably of ≥30% to ≤95%, more preferably ≥40% to ≤93%, for the chosen radiation determined by the UV-VIS-NIR-MIR method according to DIN EN ISO/IEC 17025.

Such tungstates are prepared by mixing, for example, tungsten trioxide, tungsten dioxide, a hydrate of a tungsten oxide, tungsten hexachloride, ammonium tungstate or tungstic acid and optionally further salts containing the element M, for example cesium carbonate, in particular stoichiometric ratios such that the molar ratios of the individual components are given by the formula $M_xW_yO_z$. This mixture is subsequently treated in a reducing atmosphere, for example an argon-hydrogen atmosphere, at temperatures between 100° C. and 850° C., and finally the powder obtained is heat-treated in an inert gas atmosphere at temperatures between 550° C. and 1200° C. The inorganic IR absorber nanoparticles of the invention may be produced by mixing the IR absorber with the dispersants described hereinbelow and further organic solvents, for example toluene, benzene or similar aromatic hydrocarbons, and grinding in suitable mills, for example ball mills, with addition of zirconium oxide (for example having a diameter of 0.3 mm) to produce the desired particle size distribution. The nanoparticles are obtained in the form of a dispersion. After grinding, it is optionally possible to add further dispersants. The solvent is removed at elevated temperatures and reduced pressure. Preference is given to nanoparticles having an average size smaller than 200 nm, more preferably smaller than 100 nm. The size of the particles can be determined with the aid of transmission electron microscopy (TEM). Measurements of this kind on IR absorber nanoparticles are described, for example, in Adachi et al., J. Am. Ceram. Soc. 2008, 91, 2897-2902.

The preparation of the tungstates is more particularly described, for example, in EP-A 1 801 815, and they are commercially available, for example, from Sumitomo Metal Mining Co., Ltd. (Japan) under the designation YMDS 874.

For example, for the use thereof in layer constructions with at least one layer (A) comprising transparent thermoplastics having a radiation transmittance for the selected radiation of ≥10% to ≤99%, preferably of ≥30% to ≤95%, more preferably ≥40% to ≤93%, determined by the UV-VIS-NIR-MIR method according to DIN EN ISO/IEC 17025, the particles thus obtained are dispersed in an organic matrix, for example in an acrylate, and optionally ground as described above in a mill using suitable auxiliaries, for example zirconium dioxide, and optionally using organic solvents, for example toluene, benzene or similar hydrocarbons.

Suitable polymer-based dispersants are, in particular, dispersants having high transmittance, for example polyacrylates, polyurethanes, polyethers, polyesters or polyesterurethanes and polymers derived therefrom.

Preferred dispersants are polyacrylates, polyethers and polyester-based polymers, and particularly preferred dispersants of high thermal stability are polyacrylates, for example polymethylmethacrylate, and polyesters. It is also possible to use mixtures of these polymers or else copolymers based on acrylate. Dispersing auxiliaries of this kind and methods for production of tungstate dispersions are described, for example, in JP 2008214596 and in Adachi et al. J. Am. Ceram. Soc. 2007, 90 4059-4061. Suitable dispersants are commercially available.

Polyacrylate-based dispersants in particular are suitable. Such suitable dispersants are obtainable, for example, from Ciba Specialty Chemicals under the trade names EFKA™, for example EFKA™ 4500 and EFKA™ 4530. Polyester-containing dispersants are likewise suitable. They are obtainable, for example, from Avecia under the Solsperse™ trade name, for example Solsperse™ 22000, 24000 SC, 26000, 27000. Polyether-containing dispersants are also known, for example, under the Disparlon™ DA234 and DA325 trade names from Kusumoto Chemicals. Polyurethane-based systems are also suitable. Polyurethane-based systems are obtainable from Ciba Specialty Chemicals under the EFKA™ 4046, EFKA™ 4047 trade name. Texaphor™ P60 and P63 are corresponding trade names from Cognis.

The additive preferably comprises at least one or more organic and/or inorganic IR absorbers.

The amount of the IR absorber in the dispersant may be 0.2% by weight to 50.0% by weight, preferably 1.0%-40.0% by weight, more preferably 5.0%-35.0% by weight and most preferably 10.0%-30.0% by weight based on the dispersion of the inorganic IR absorber used in accordance with the invention. The overall composition of the ready-to-use IR absorber formulation may include not only the pure IR absorber material and the dispersant but also further auxiliaries, for example zirconium dioxide, and residual solvents, for example toluene, benzene or similar aromatic hydrocarbons.

There are no limitations whatsoever to the amount of the inorganic IR absorbers, more preferably those from the group of tungstates, in the polymer compositions of the layer constructions. However, the inorganic IR absorbers, especially the tungstates, may typically be used in an amount of ≥0.7% by weight to ≤4.5% by weight, preferably ≥0.6% by weight to ≤2% by weight and more preferably ≥0.7% by weight to ≤1.5% by weight, calculated as the solids fraction of inorganic IR absorber in the total polymer composition.

In the present context, the term "solids fraction of inorganic IR absorber", especially tungstate, means the inorganic IR absorber, especially the tungstate, as a pure substance and not as a dispersion, suspension or other preparation containing the pure substance, where the contents of IR additive, especially the tungstate content, reported hereinafter always relate to this solids fraction unless explicitly stated otherwise.

Preferably, further IR absorbers may optionally be used in addition to the tungstates as IR absorbers, where the proportion in terms of the amount thereof in such a mixture is always below that of the above-described tungstates. In the case of mixtures, preference is given to compositions containing two to five (inclusive) and particular preference to two or three different IR absorbers. The further IR absorber is preferably selected from the group of borides and tin oxides, more preferably $LaB_6$ or antimony-doped tin oxide or indium tin oxide.

Alternatively, the layer construction may be coated with an additive in the form of a coating composition which has an absorption maximum in the wavelength range of the focused nonionizing electromagnetic radiation used. These coating compositions preferably comprise an IR absorber which absorbs in the wavelength range from ≥0.70 μm to ≤1000 μm, preferably in the range from ≥1.0 μm to ≤50 μm, more preferably in the range from ≥1.0 μm to ≤2.5 μm. These coating compositions are commercially available, for example, as Clearweld™ under the LD920, LD930 or LD940 name.

The at least one additive having an absorption maximum in the wavelength range of the focused nonionizing electromagnetic radiation used may be present in the layer construction.

The invention further provides a process for producing a colored layer construction, comprising the steps of:
  i) proceeding from a preferably uncolored layer construction at least having
    i)1. a first transparent radiation-engravable layer (A) having a first surface a1), and a second surface a2), where the surfaces run essentially parallel to one another,
    i)2. optionally a further transparent radiation-engravable layer (B) having a first surface b1) facing in the direction of the first layer (A) and a further surface b2) facing in the opposite direction and therefore away from the first layer (A);
  ii) contacting at least part of the first surface a1) of the first transparent radiation-engravable layer (A) with a colorant, preferably with a coloring bath (F) containing the colorant;
  iii) irradiating the layer construction from ii) with focused nonionizing electromagnetic radiation from the side remote from the coloring bath (F) through the surface a2) or optionally also b2).

The layer construction preferably has two outer faces that come into contact with the nonionizing electromagnetic radiation in step iii). One of the outer faces is preferably formed by the first surface a1). The further outer face is preferably formed by the second surface a2) or, if present, by the further surface b2). The layer construction, in a step iv), may be overlaid by further layers or coatings on one of the outer sides.

As already described above in connection with the layer construction of the invention, the incidence of the focused nonionizing radiation on the first surface a1) of the first layer (A) results in a colored or black engraving over part of the area. When the focused nonionizing radiation is incident on the outer face formed by the second surface a2) of the first layer (A) or by the further surface b2) of the further layer (B), the result is an image of the colored or black engraving over part of the area in the form of a nontransparent structural alteration at the outer face, i.e. the surface a2) or b2) of the layer construction.

The coloring bath (B) may comprise at least one colorant, preferably at least one dye, more preferably at least one dye from the group of solvent dyes and/or disperse dyes according to the Colour Index classification or mixtures of these dyes.

The Colour Index (CI) of the Society of Dyers and Colourists and the American Association of Textile Chemists and Colorists unambiguously characterizes all colorants via the group name and the number for the chemical composition/chemical structure.

Dyes from the group of solvent dyes according to the Colour Index classification may, for example, be those called the Macrolex™ dyes from Lanxess AG, Germany. Examples include Macrolex™ Blue 3R, Macrolex™ Red H, Macrolex™ Yellow 6G (Solvent Yellow 179 according to CI), Macrolex™ Violet Red R (Disperse Violet 31 according to CI), Macrolex™ Orange R (Solvent Orange 107 according to CI) or mixtures of these dyes.

Dyes from the group of the disperse dyes according to the Colour Index classification may be for example diazo, diphenylamine and anthraquinone compounds, acetate dyes, disperse dyes and/or dispersol dyes and include disperse blue #3, disperse blue #14, disperse yellow #3, disperse red #134 and disperse red #7. The classification and description of the abovementioned dyes are in accordance with "The Colour Index", 3rd edition, joint publication of the Society of Dyes and Colors and the American Association of Textile Chemists and Colorists (1971). Very generally, the dyes may be used either as a single dye constituent or as a component of a mixture according to the desired color. Thus the term "dye" used here also encompasses dye mixtures.

Suitable dyes include water-insoluble diazo-diphenylamine and anthraquinone compounds. Particularly suitable are acetate dyes, dispersed acetate dyes, disperse dyes and dispersol dyes, as disclosed in the Colour Index, 3rd edition, volume 2, The Society of Dyers and Colourists, 1971, p. 2479 and 2187-2743.

The preferred dispersed dyes include Dystar's Palanil Blue E-R150 (anthraquinone/disperse blue), DIANIX Orange E-3RN (azo dye/Cl disperse-Orange 25) and the abovementioned Macrolex™ dyes as solvent dyes.

The coloring bath preferably comprises:
  a) solvent and/or dispersant, preferably water and/or organic solvent, more preferably water
  b) colorant, preferably a dye, more preferably a dye from the solvent dyes and/or disperse dyes according to the Colour Index classification
  c) isopropanol Advantageous coloring baths have been found to be those suitable for simultaneous coloring of polycarbonate layer constructions at temperatures >80° C. These are described for example in WO-A 03/040461, EP-A 2050866, WO-A 03/083207. Under the conditions of the process of the invention, essentially partial coloring of the layer construction takes place in the irradiated regions, so that an intensive engraving becomes visible precisely at these sites.

Further preferably, the coloring bath therefore comprises component c) in addition to components a) and b) already mentioned.

Components a) to c) may be present in the following amounts based on the total weight of the coloring bath:
  a) 10% to 90% by weight, preferably 15% to 85% by weight, more preferably 35% to 50% by weight,
  b) 0.01% to 50% by weight, preferably 0.1% to 20% by weight, more preferably 0.2% to 15% by weight,
  c) 5% to 90% by weight, preferably 10% to 80% by weight, more preferably 15% to 60% by weight.

The coloring bath preferably comprises a dye and/or a dye mixture selected from the group of the disperse dyes according to the Colour Index classification, very particularly a dye selected from the group consisting of azo, diphenylamine and anthraquinone compounds.

The coloring bath preferably comprises a dye and/or a dye mixture selected from the group of the solvent dyes according to the Colour Index classification, most preferably a dye and/or dye mixture of the Makrolex™ dyes.

The solvent and/or dispersant a) used may be water and/or organic solvent. Preference is given to using water.

Useful organic solvents include all standard solvents that do not attack the layer construction on contact, and especially do not attack it in a chemical manner, i.e. more particularly have no effect on the optical properties thereof. Examples include butyl alcohol, butylene glycol, diethylene glycol, ethyl alcohol, ethylene glycol, heptane, hexane, pentane, propargyl alcohol, propyl alcohol or mixtures of the abovementioned solvents.

Preference is given to using water and c) in the process of the invention.

The irradiation of the layer construction in step iii) is effected with focused nonionizing electromagnetic radiation, where the wavelength range of the focused nonionizing electromagnetic radiation is chosen such that the coloring bath has a radiation transmittance of ≥2% to ≤99%, preferably of ≥30% to ≤95%, more preferably of ≥40% to ≤93%, for the chosen radiation, determined by the UV-VIS-NIR-MIR method according to DIN EN ISO/IEC 17025.

The irradiation in step iii) is preferably effected with laser radiation with a wavelength in the range from ≥0.1 µm to ≤1000 µm, preferably from ≥1.0 µm to ≤50 µm, more preferably from ≥1.0 µm to ≤2.5 µm.

If the irradiation is effected by laser, this can be effected in continuous wave operation (CW laser), especially for the engraving of pixel files or gray shade files. Particular preference is given to using pulsed laser radiation for the irradiation of the layer constructions or for vector images, or half-tone images. A pulse frequency of 0.5 kHz to 1000 kHz is preferably used; preference is given to using pulse frequencies of 5 kHz to 100 kHz, particular preference to pulse frequencies of 15 kHz to 50 kHz.

By varying the power of the laser beam used for the irradiation in step iii), it is possible to influence the intensity of the coloring at the lasered sites according to the demand made on the desired application. The higher the laser output used, the more intense the coloring at the lasered sites of the layer construction.

By varying the frequency of the laser beam used for the irradiation in step iii), it is possible to match the tactile engraving of side a1) of layer (A), i.e. the side of the layer construction remote from the coloring bath, in gray shades. In the case of low frequencies, the pulse duration is long enough to enable partial carbonization of side a1) in the case of organic materials. This causes the engraving to appear in a dark color. This is accomplished at frequencies of less than 30 kHz, with a laser having a nominal power of 60 watts. In the case of frequencies over and above 30 kHz, the pulse duration is particularly short. The structural alteration of the material thus becomes visible and perceptible, but carbonization in the case of organic materials is effected only to a limited degree, if at all. The structural alteration thus appears as a colorless or white engraving.

Preference is given to using NdYAG lasers (neodymium-doped yttrium aluminum garnet lasers) in the process. However, for the color laser engraving of layer constructions, it is also possible to use those laser types that are suitable for the engraving and welding of plastics parts, such as layer constructions. For example, it is also possible to use a $CO_2$ laser.

The color concentration of the coloring bath may also influence the intensity of the partial coloring of the plastics part, such as the layer construction of the invention, after irradiation. Preference is given to a concentration of colorant, preferably dye b), of 0.01% to 50% by weight, more preferably of 0.1% to 30% by weight, most preferably of 0.2% to 20% by weight, based on the total weight of the coloring bath.

In a preferred embodiment of the process, the layer construction in step iii) is preferably irradiated through the further layer (B) onto the first layer (A).

In a preferred embodiment of the process, at least layer (A), and preferably also layer (B), include(s) a thermoplastic selected from the group consisting of polymers of ethylenically unsaturated monomers, polycondensates of bifunctional reactive compounds and polyaddition products of bifunctional reactive compounds or combinations of at least two of these.

For avoidance of repetitions, reference is made hereinafter to the above details relating to the thermoplastic with regard to preferred embodiments, material, composition and additives as in connection with the layer construction of the invention.

In a preferred embodiment of the process, layer (A), and optionally also layer (B), comprise(s) at least one additive having an absorption maximum in the wavelength range of the focused nonionizing electromagnetic radiation used, or wherein layer (A), and preferably also layer (B), is/are coated with at least one additive in the form of a coating composition having an absorption maximum in the wavelength range of the focused nonionizing electromagnetic radiation used. Preferred additives and their preferred amounts have already been mentioned above.

In a preferred embodiment of the process, the additive comprises at least one or more organic and/or inorganic IR absorbers.

In a preferred embodiment of the process, the colorant or coloring bath (F) comprises at least one dye from the group of solvent dyes and/or disperse dyes according to the Colour Index classification or mixtures of these dyes.

In a preferred embodiment of the process, the coloring bath (F) comprises:
a) solvent and/or dispersant, preferably water and/or organic solvent,
b) at least one colorant, preferably at least one dye, more preferably at least one dye from the solvent dyes and/or disperse dyes according to the Colour Index classification or a mixture of the aforementioned dyes.

Layer (A), and preferably also layer (B), preferably include(s) at least one thermoplastic and/or at least one black pigment, preferably carbon black.

The first surface a1) of the layer construction is preferably irradiated through surface a2) prior to step ii) with focused nonionizing electromagnetic radiation (E) in the absence of the coloring bath.

The layer construction may preferably comprise at least one layer of a thermoplastic comprising at least one additive having an absorption maximum in the wavelength range of the focused nonionizing electromagnetic radiation used, and wherein this at least one layer of a thermoplastic has a radiation transmittance of ≥10% to ≤99%, preferably of ≥30% to ≤95%, more preferably ≥40% to ≤93%, for the chosen radiation determined by the UV-VIS-NIR-MIR method according to DIN EN ISO/IEC 17025, preferably an inorganic IR absorber, more preferably an inorganic IR absorber from the group of tungstates. This layer preferably forms an outer layer of the layer construction which is ultimately also color laser engraved.

The layer construction preferably comprises this at least one outer layer of a thermoplastic containing at least one additive having an absorption maximum in the wavelength range of the focused nonionizing electromagnetic radiation used, and wherein this at least one layer of a thermoplastic has a radiation transmittance of ≥10% to ≤99%, preferably of ≥30% to ≤95%, more preferably ≥40% to ≤93%, for the chosen radiation determined by the UV-VIS-NIR-MIR method according to DIN EN ISO/IEC 17025, preferably an inorganic IR absorber, more preferably an inorganic IR absorber from the group of tungstates, and a further layer containing at least one thermoplastic and at least one laser-sensitive additive, preferably black pigment, more preferably carbon black.

This embodiment enables combination, for example, of the color laser engraving of the invention with black laser engraving. For this purpose, the layer construction, especially layer (A), either before step i) and/or after step iii), may be irradiated with E) in the absence of the coloring bath (B) as in step iii).

The same radiation (C) may ideally be used for this further irradiation. The irradiation with (C) in the absence of the coloring bath (F) makes it possible to apply a black engraving to the surface at the desired site, preferably in transparent layers of the layer construction beneath. In the case of laser engraving outside the coloring bath, the high laser reactivity of these layer constructions results in blackening at the laser-irradiated sites. If the layer construction is in the coloring bath, the intensity of the laser beam is attenuated by the coloring bath in such a way that coloring is effected only at the irradiated sites, but no blackening of the surface of the layer construction is brought about.

In order to create a black or white laser engraving outside the coloring bath, the procedure is preferably as follows: By varying the frequency of the laser beam used, it is possible to adjust the tactile engraving of the layer construction in gray shades. In the case of low frequencies, the pulse duration is long enough to enable carbonization in the layer in the case of organic materials. This causes the engraving to appear in a dark color. This is accomplished at frequencies of less than 30 kHz, with a laser having a nominal power of 60 watts. In the case of frequencies over and above 30 kHz, the pulse duration is particularly short. This makes a structural alteration in the material visible and perceptible, and there is only limited carbonization, if any, in the case of organic materials. This means that the engraving has a colorless or white appearance.

The invention further relates to a security document comprising a layer construction of the invention or a layer construction obtainable by the process of the invention. More particularly, the security documents that have been personalized or color-engraved by the process of the invention, such as ID cards, passports and driving licences, and other personalized security documents, feature high forgeryproofing of the personalized or color-engraved information applied. The process of the invention can be used to personalize blank documents in a decentralized and forgeryproof manner in color, including in combination with black-and-white engravings. It is additionally possible to create tactile laser engravings in color and alternatively also in combination with black-and-white engravings, which was possible to date only in black.

EXAMPLES

Film 1: Makrofol™ ID 6-2 00000 transparent, composed of polycarbonate in a thickness of 600 μm, from Covestro Deutschland AG (corresponding to layer (C) of the layer construction of the invention).

Film 2: Transparent polycarbonate film with IR absorber in a thickness of 100 μm was produced as follows (corresponding to layer (A) or (B) of the layer construction of the invention):

Masterbatch: Compounding of a Highly Concentrated IR Masterbatch

The masterbatch for the production of the film 2 was produced with a conventional twin-screw compounding extruder (ZSK 32) at processing temperatures customary for polycarbonate of 250° C. to 330° C.

A masterbatch having the following composition was compounded and subsequently pelletized:
- 94.69% by weight of Makrolon™ 3108 polycarbonate from Covestro Deutschland AG
- 0.75% by weight of YMDS 874 IR absorber from Sumitomo
- 4.5% by weight of Makrolon™ 3108 powder from Covestro Deutschland AG
- 0.006% by weight (60 ppm) of lamp black 101 (carbon black from Evonik-Degussa GmbH) having an average particle size of 95 nm Production of Extrusion Film 2

The apparatus used for production of the extruded film comprises:
- an extruder for extrusion of the layer containing at least one polycarbonate with a screw of diameter (D) 60 mm and length 33 D. The screw has a devolatilization zone;
- a melt pump;
- a crosshead;
- a slot die of width 450 mm;
- a three-roller smoothing calender with horizontal roll arrangement, wherein the third roll is pivotable by +/−45° relative to the horizontal;
- a roll conveyor;
- thickness measuring means a device for double-sided application of protective film;
- a take-off device;
- a winding station.

The pellets of the masterbatch were conveyed from the dryer into the filling hopper of the extruder. The material was melted and conveyed in the barrel/screw plastifying system of the extruder. The melt passed from the slot die on to the smoothing calender. The final shaping and cooling of the film was effected on the smoothing calender (consisting of three rolls). The surfaces were embossed using a textured steel roll (no. 6 side) and a textured silicone rubber roll (no. 2 side). The rubber roll used for texturing the film surface is disclosed in U.S. Pat. No. 4,368,240 to Nauta Roll Corporation. The film was subsequently transported through a take-off and then the film was wound up.

Lamination of Films 1 and 2 to Give Laminate A:

Lamination was effected on a Bürckle 50/100 lamination press.

The following layer construction of the laminate was created:
- Film 2, 100 μm
- Film 1, 600 μm
- Film 2, 100 μm The abovementioned layer construction was laminated with the following press settings:
- Preheating the press to 170-180° C.
- Pressing for 8 minutes at a pressure of 15 N/cm$^2$
- Pressing for 2 minutes at a pressure of 100 N/cm$^2$
- Cooling the press to 38° C. and opening the press High-gloss lamination sheets were used for the lamination; the laminate thus received high-gloss surfaces on either side and hence had a glass-clear appearance.

Composition of the Coloring Bath
5% by weight of water
15% by weight of Macrolex™ Blue 3R (dye, from Lanxess AG Deutschland)
80% by weight of isopropanol Example 1

Four spacers were placed into the coloring bath (F) of the above-specified composition. A layer construction of the invention in the form of laminate A with the properties as described above was placed onto the spacers. The height of the spacers was adjusted such that the laminate A was wetted by the coloring bath (F) only from its lower side.

Laser irradiation of laminate A was accomplished using a Foba D84S NdYAG 1064 nm laser. This was operated with a laser power of about 7.5 watts, a laser frequency of 30 kHz in pulsed operation, and a current of 30 A. The running speed was set to 60 mm/s. The coloring bath (F) with the film was placed on the workpiece carrier of a Foba D84S laser apparatus. The focus of the laser was adjusted to the film surface of laminate A.

After the irradiation, the laminate A was removed from the coloring bath (F) and cleaned with water. When laminate A was viewed from its side facing the irradiation source, the following observations were made: When viewed against a dark background, the laser-engraved elements appeared in a white color; it was impossible or almost impossible to perceive the blue color; the laser engraving appeared white. When viewed against a white background, it was possible to clearly perceive the blue color.

When laminate A was viewed from its side facing the coloring bath (F), it was possible to clearly perceive the color, both against a white or light-colored background and against a black or dark-colored background.

An explanation for this effect has already been given in the description in the definition of the structural alteration.

For determination of the haze of the layer construction at the surface with which the laser comes into contact first in the irradiation, surface a2) in this case, a determination of turbidity was undertaken in accordance with standard ASTM D1003:2013, which is equivalent to ISO 13468-1. For this purpose, a BYK-Gardner haze gard plus instrument was used, which was used to determine haze in accordance with standard ASTM D1003:2013. The haze measured attained a value of 87.2%, with 0% representing zero haze, corresponding to a glass-clear layer. The layer construction had a haze of 5% at the sites that had not been irradiated with laser light. Using the same standard, transmittance through the laminate A prior to engraving by laser was found to be 81.1%, whereas transmittance after introduction of the engraving by laser at the engraved sites was 38.2%.

Example 2

Example 1 was repeated with a red coloring bath and a yellow coloring bath.

The composition of the coloring bath was the same as in example 1, except for the dye. The red dye used was: Macrolex® Red H.

The yellow dye used was: Macrolex® Yellow 6G.

When the laminates were viewed against a dark background, the laser-engraved elements appeared in a white color; it was impossible to perceive the color; the laser engraving appeared white. When viewed against a white background, it was possible to clearly perceive the red and yellow color.

When the laminate was viewed from its side facing the coloring bath (F), it was possible to clearly perceive the color, both against a white or light-colored background and against a black or dark-colored background.

For determination of the haze of the layer construction at the surface with which the laser comes into contact first in the irradiation, surface a2) in this case, a determination of turbidity was undertaken in accordance with standard ASTM D1003:2013, which is equivalent to ISO 13468-1. For this purpose, a BYK-Gardner haze gard plus instrument was used, which was used to determine haze in accordance with standard ASTM D1003:2013. The haze measured attained a value of 87.2%, with 0% representing zero haze, corresponding to a glass-clear layer. The layer construction had a haze of 5% at the sites that had not been irradiated with laser light.

FIGURES

Figures 1A, 1B, 1C, 2:
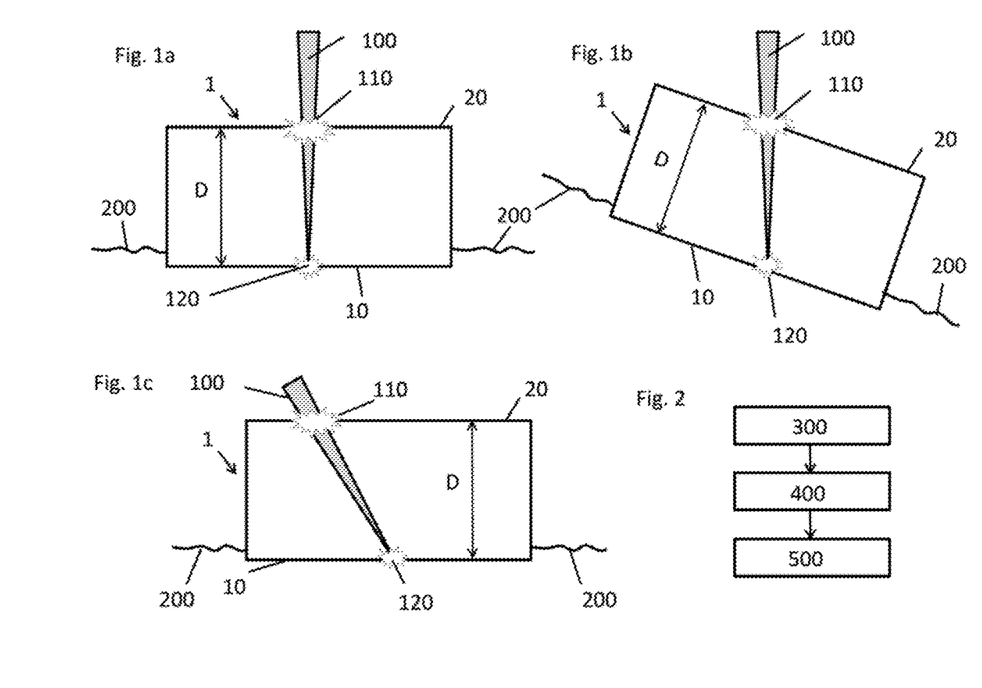
FIG. 1a shows a schematic diagram of a layer construction of the invention as a side view in which both the colored or black engraving over part of the area and the nontransparent structural alteration are introduced by laser as a perpendicular image relative to one another.
FIG. 1B provides a schematic diagram of a layer construction of the invention as in FIG. 1, but with layer construction rotated by about 45° relative to the laser.
FIG. 1c illustrates a schematic diagram of a layer construction of the invention as in FIG. 1, but with laser rotated by about 45° relative to the layer construction.
FIG. 2 is a schematic diagram of the production process.

FIG. 1a shows how a color 120 was introduced on the first surface a1) 10 and a nontransparent structural alteration 110 on the further surface a2) 20 under the conditions described above for the examples onto a layer construction 1 produced as described in example 1 or 2. For laser irradiation of the layer construction 1 in the form of laminate A, the laser light 100 was first directed vertically onto the further surface a2) 20 of layer construction 1. When the laser beam 100 hit the further surface a2) 20 of layer construction 1, the nontransparent structural alteration 110 was created. The laser beam 100 then ran vertically to the further surface a2) 20 through the thickness D of the layer construction 1. When it hit the first surface a1) 10, the laser light 100 that had been passed through the layer construction 1, once it had made the structural alteration 110, created the colored or black engraving 120. This coloring was possible since the first surface 10 was in direct contact with a coloring bath 200.

FIG. 1b shows the same process as shown in FIG. 1a, with the layer construction 1, but especially the further surface 20 of the layer construction 1, rotated by a few degrees relative to the angle of incidence of the laser, such that the laser beam 100 hit the further surface 20 of the layer construction 1 at an angle of about 45°. The beam path of the laser light 100 is likewise through the thickness D of the layer construction, with the laser beam covering a somewhat greater distance than in the arrangement in FIG. 1. As a result, the non-transparent structural alteration 110 that constitutes the image of the colored or black engraving 120 over part of the area is in a slightly shifted arrangement relative to the normal through the layer construction 1.

FIG. 1c shows the same process as shown in FIG. 1a, with the laser and hence the laser light 100 rotated by a few degrees relative to the further surface 20 of the layer construction 1, such that the laser beam 100 hit the further surface a2) 20 of the layer construction 1 at an angle of about 45°. The beam path of the laser light 100 is likewise through the thickness D of the layer construction, with the laser beam covering a somewhat greater distance than in the arrangement in FIG. 1. As a result, the non-transparent structural alteration 110 that constitutes the image of the engraving 120 is in a slightly shifted arrangement relative to the normal through the layer construction 1.

FIG. 2 shows the steps of the process of the invention. In step i) 300, the uncolored layer construction 1 was provided in the form of laminate A. As described above for FIG. 1a, this takes place on the workpiece carrier of a Foba D84S laser apparatus. For step ii) 400, a coloring bath (F) 200 was placed beneath the layer construction 1 such that only the first surface a1) 10 was in contact with the coloring bath (F) 200. In the third step iii) 500, the layer construction 1 was first irradiated by means of laser beam 100 onto the further surface a2) 20 of the layer construction 1, with creation of a non-transparent structural alteration 110 on the further surface a2) when hit by the laser light 100. Thereafter, the laser light hit the first surface a1) 10 in order to create the colored or black engraving 120 over part of the area there.

The invention claimed is:

1. A layer construction comprising:
   (A) a first transparent radiation-engravable layer (A) having a first surface a1), and a second surface a2) that runs parallel to the first surface a1), wherein the first layer (A) on its first surface a1) which forms a first outer face of the layer construction has a colored or black engraving over a part of the area that has been produced by means of nonionizing electromagnetic radiation (E);
   (B) a further transparent radiation-engravable layer (B) having a first surface b1) facing in a direction of the first layer (A) and a further surface b2) facing in a direction away from the first layer (A) and parallel to the first surface b1);
   (C) at least one additional transparent polymer layer (C), wherein arrangement of an additional layer (C) is selected from the group consisting of: on a side of a further surface b2) of the first layer (B), between the two layers (A) and (B), or a combination of at least two of these in the case of multiple further layers (C),
   wherein an image of the colored or black engraving over part of the area is present in the form of a nontransparent structural alteration at the surface of the layer construction forming a further outer face of the layer construction and is opposite the first surface a1), and
   wherein the nontransparent structural alteration at the surface of the layer construction has a cloudy or milky appearance with a haze of ≥80%.

2. The layer construction as claimed in claim 1, wherein layer (B) at sites with the altered structure has a layer thickness at least 0.001 mm thicker than at the sites without altered structure.

3. The layer construction as claimed in claim 1, wherein at least one of layers (A), (B) and (C) has one of the following properties:
   I. a layer thickness within a range from 10 μm to 10 000 μm;
   II. a radiation transmittance of ≥2% to ≤99.95%, for the chosen radiation, determined by the UV-VIS-NIR-MIR method to DIN EN ISO/IEC 17025.

4. The layer construction as claimed in claim 1, wherein at least layer (A), includes a thermoplastic selected from the group consisting of polymers of ethylenically unsaturated monomers, polycondensates of bifunctional reactive compounds, and polyaddition products of bifunctional reactive compounds, and combinations of at least two of these.

5. The layer construction as claimed in claim 1, wherein layer (A), comprises at least one additive having an absorption maximum in the wavelength range of focused nonionizing electromagnetic radiation, or wherein layer (A), is coated with at least one additive in a coating composition having an absorption maximum in the wavelength range of the focused nonionizing electromagnetic radiation.

* * * * *